(12) United States Patent
McDysan

(10) Patent No.: US 9,106,445 B2
(45) Date of Patent: Aug. 11, 2015

(54) VIRTUAL EXTENDED NETWORK

(75) Inventor: David Edward McDysan, Great Falls, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 315 days.

(21) Appl. No.: 13/162,114

(22) Filed: Jun. 16, 2011

(65) Prior Publication Data

US 2012/0324536 A1   Dec. 20, 2012

(51) Int. Cl.
*G06F 21/00* (2013.01)
*G06F 15/16* (2006.01)
*H04L 12/46* (2006.01)
*H04L 29/06* (2006.01)

(52) U.S. Cl.
CPC ........ *H04L 12/4641* (2013.01); *H04L 12/4645* (2013.01); *H04L 12/4679* (2013.01); *H04L 63/0236* (2013.01); *H04L 63/0884* (2013.01)

(58) Field of Classification Search
None
See application file for complete search history.

(56) References Cited

U.S. PATENT DOCUMENTS

| | | | |
|---|---|---|---|
| 2005/0083949 A1* | 4/2005 | Dobbins et al. | 370/395.53 |
| 2009/0006603 A1* | 1/2009 | Duponchel et al. | 709/223 |
| 2009/0172156 A1* | 7/2009 | Yadav et al. | 709/224 |

OTHER PUBLICATIONS

Wagner-Hall, "A Prototype Implementation of MOOSE on a NetFPGA/OpenFlow/NOX Stack," University of Cambridge Computer Laboratory, Sep. 2010, 5 pages.
Scott et al., "Addressing the Scalability of Ethernet with MOOSE draft-malc-armd-moose-00," University of Cambridge, Oct. 18, 2010, 20 pages.

\* cited by examiner

*Primary Examiner* — Jung Kim
*Assistant Examiner* — Adrian Stoica

(57) ABSTRACT

A network device may receive a data structure, intended for a second computing device, from a first computing device. The network device may determine, based on the first data structure, whether the first computing device and the second computing device correspond to the same virtual network. When then the first computing device and the second computing device correspond to the same virtual network, the network device may communicate the data structure to the second computing device. However, when the first computing device and the second computing device do not correspond to the same virtual network, the network device may disregard the data structure.

24 Claims, 14 Drawing Sheets

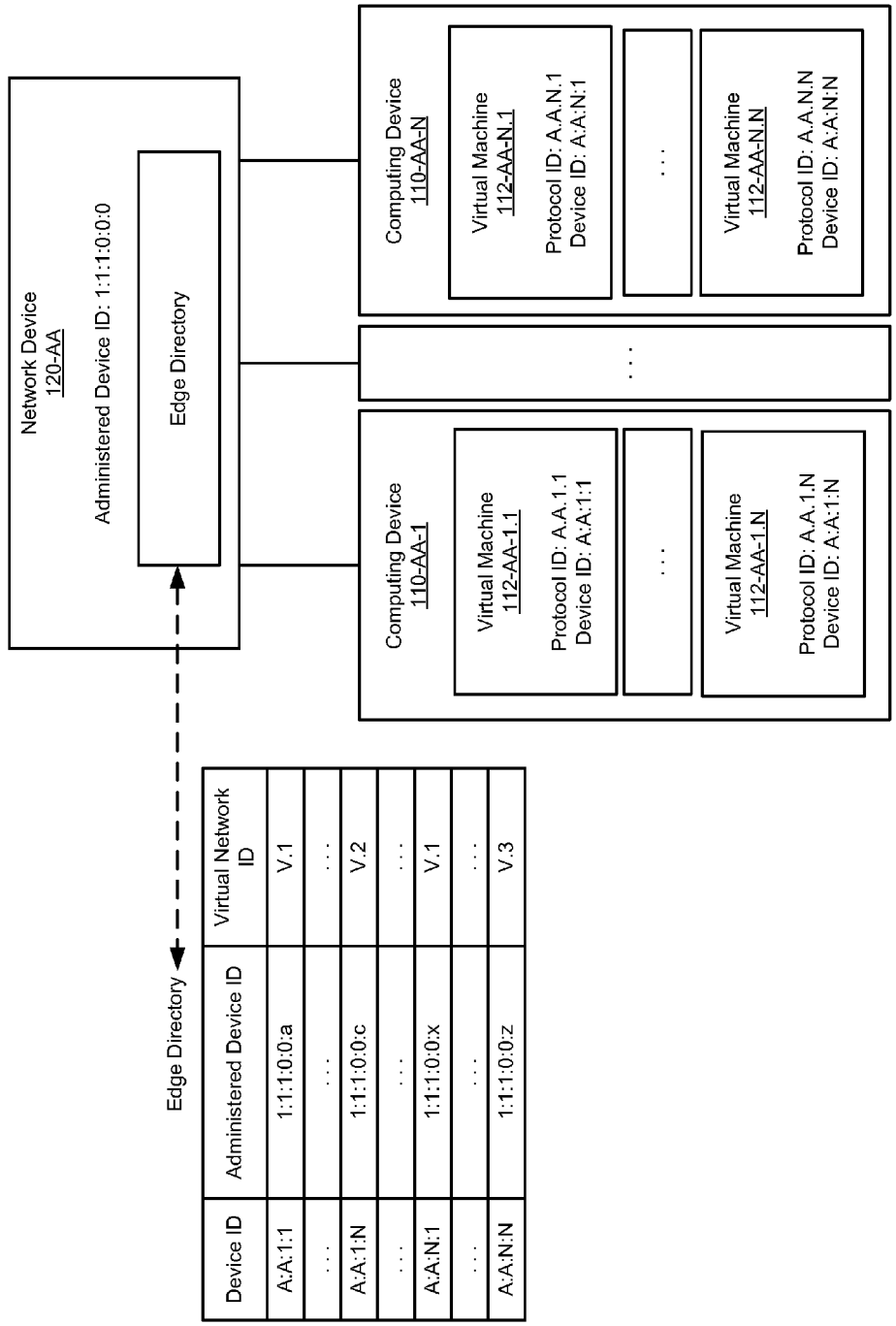

FIG. 8A

Network Validation Server
140

Network Validation Directory

| Administered Device ID | Virtual Network ID |
|---|---|
| 1:1:1:0:0:a | V.1 |
| 1:1:1:0:0:c | V.2 |
| 1:1:1:0:0:x | V.1 |
| 1:1:1:0:0:z | V.3 |
| 1:1:1:0:0:r | V.1 |
| 1:1:1:0:0:s | V.2 |
| 1:1:1:0:0:t | V.3 |
| 1:1:1:0:0:u | V.1 |
| ... | ... |

Network Device
120-AA

Edge Directory

| Device ID | Administered Device ID | Virtual Network ID |
|---|---|---|
| A:A:1:1 | 1:1:1:0:0:a | V.1 |
| A:A:1:N | 1:1:1:0:0:c | V.2 |
| A:A:N:1 | 1:1:1:0:0:x | V.1 |
| A:A:N:N | 1:1:1:0:0:z | V.3 |

Network Device
120-BB

Edge Directory

| Device ID | Administered Device ID | Virtual Network ID |
|---|---|---|
| B:B:1:1 | 1:1:1:0:0:r | V.1 |
| B:B:1:N | 1:1:1:0:0:s | V.2 |
| B:B:N:1 | 1:1:1:0:0:t | V.3 |
| B:B:N:N | 1:1:1:0:0:u | V.1 |

Network Validation Server
140

Network Validation Directory

| Administered Device ID | Virtual Network ID |
|---|---|
| 1:1:1:0:0:a | V.1 |
| 1:1:1:0:0:c | V.2 |
| 1:1:1:0:0:x | V.1 |
| 1:1:1:0:0:z | V.3 |
| 1:1:1:0:0:r | V.1 |
| 1:1:1:0:0:s | V.2 |
| 1:1:1:0:0:t | V.3 |
| 1:1:1:0:0:u | V.1 |
| ... | ... |

Network Address Server
150

Network Directory

| Administered Device ID | Protocol ID |
|---|---|
| 1:1:1:0:0:a | A.A.1.1 |
| 1:1:1:0:0:c | A.A.1.N |
| 1:1:1:0:0:x | A.A.N.1 |
| 1:1:1:0:0:z | A.A.N.N |
| 1:1:1:0:0:r | B.B.1.1 |
| 1:1:1:0:0:s | B.B.1.N |
| 1:1:1:0:0:t | B.B.N.1 |
| 1:1:1:0:0:u | B.B.N.N |
| ... | ... |

800B

VIRTUAL EXTENDED NETWORK

BACKGROUND

Currently available network technologies include a variety of different networks, such as local area networks (LANs), wide area networks (WANs), and wireless networks. These technologies are utilized in a variety of ways, including the virtualization of networks (e.g., virtual private networks (VPNs)) and the virtualization of devices (e.g., virtual machines). While the virtualization of networks and devices has increased the utility and adaptability of network technologies, virtualization has also exposed various deficiencies in current network technologies, such as scalability.

BRIEF DESCRIPTION OF THE DRAWINGS

FIG. 5 is a diagram of example devices and data structures corresponding to one or more implementations described herein;

FIGS. 8A-8B are diagrams of devices that may be used within the environment of FIG. 2;

DETAILED DESCRIPTION OF PREFERRED EMBODIMENTS

The following detailed description refers to the accompanying drawings. The same reference numbers in different drawings may identify the same or similar elements.

In one or more implementations, described herein, scalability in virtual networks may be increased by associating computing devices with virtual networks for authentication purposes. For instance, a network device may receive a message from a computing device that belongs to a virtual network. The network device may modify the message to include an identifier (ID) of the virtual network. The virtual network ID may be used by other network devices to authenticate the message.

Figure 1:
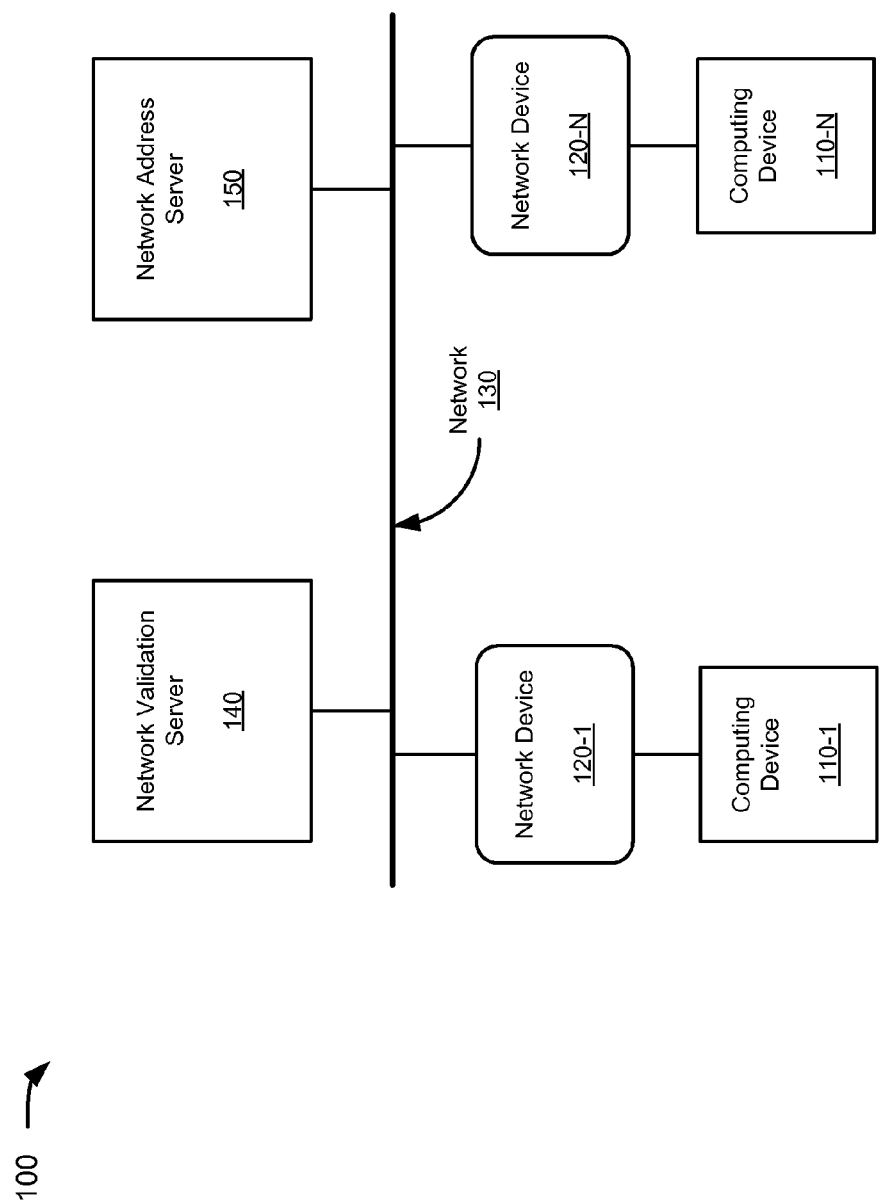
FIG. 1 is a diagram of an overview of an implementation described herein.

FIG. 1 is a diagram of an overview 100 of an implementation described herein. As depicted, overview 100 may include computing devices 110-1, ..., 110-N (where N≥1) (collectively referred to as "computing devices 110," and individually as "computing device 110"), network devices 120-1, ..., 120-N (collectively referred to as "network devices 120," and individually as "network device 120"), network 130, network validation server 140, and network address server 150. The letter "N" as applied herein to identify devices, systems, networks, operations, and/or data structures may represent a potential for a plurality of devices, systems, networks, operations, and/or data structures, as may be applicable. The letter "N" in one instance may represent a number that is different from a number represented by the letter "N" in another instance.

Computing device 110 may include one or more of a variety of computing devices capable of operating in a network environment. Examples of computing device 110 may include smart phones, laptop computers, tablet computers, desktop computers, servers, clusters of servers, or one or more other types of computing devices. In some implementations, computing device 110 may include a device ID or a protocol ID.

A device ID may include any sequence of characters or other data structures capable of identifying an electronic device, such as computing device 110, network device 120, network validation server 140, or network address server 150. An example of a device ID is a media access control (MAC) address. Similarly, a protocol ID may include any sequence of characters or other data structures capable of identifying an electronic device according to one or more protocols. An example of a protocol ID is an Internet Protocol (IP) address.

Computing device 110 may also, or alternatively, include a device directory. A device directory may include device IDs associated with protocol IDs. The device IDs and protocol IDs may correspond to other electronic devices, such as other computing devices 110, network devices 120, network validation server 140, or network address server 150. Computing device 110 may be part of one or more virtual networks, such as a VPN, a VLAN, or another type of virtual network.

Network device 120 may include one or more of a variety of network devices, including one or more gateways, routers, switches, hubs, or other types of network devices. For example, in some implementations, network device 120 may be a switch or other network device located at the edge of network 130 (e.g., a network edge device). Network device 120 may include an edge directory that includes a variety of network information, including device IDs associated with virtual network IDs. In some implementations, an edge directory may also, or alternatively, include device IDs associated with administered device IDs. In some implementations, an edge directory may be a network address translation (NAT) table or a routing table.

A virtual network ID may be an identifier associated with a particular virtual network. For example, a virtual network ID may include a VLAN stack, multiprotocol label switching (MPLS) label stack, a generic routing encapsulation (GRE) tunnel (which may include, for example, a destination address only or a combination of a source address and a destination address), or another type of virtual network ID. An administered device ID may be an identifier associated with a device ID. For example, an administered device ID may be a locally administered device address (LAA), such as an Ethernet MAC LAA or a hierarchical Ethernet MAC LAA.

Network 130 may be any type of network or combination of networks. For example, network 130 may include a local area network (LAN), a WAN (e.g., the Internet), one or more telecommunication networks, a metropolitan area network (MAN), an ad hoc network, or a fiber optic network (e.g., a fiber-optic communications (FiOS) network). In some implementations, network 130 may include a packet network, including an Ethernet network, an IP network, an MPLS network, and/or a VPN. In some implementations, network 130 may include an arrangement of switches (e.g., Ethernet switches or IP/MPLS routers) capable of providing hierarchical addressing services. In some implementations, network devices 120, network validation server 140, and/or network address server 150 may be part of network 130.

Network validation server 140 may include one or more of a variety of computing devices, such as computers, servers, clusters of servers, or other types of computing devices. Network validation server 140 may maintain a network validation directory of a variety of network information, including device IDs, administered device IDs, or virtual network IDs. Similarly, network address server 150 may include one or more of a variety of computing devices, such as computers, servers, clusters of servers, or other types of computing devices. Network address server 150 may maintain a network directory of various network information, including protocol IDs and/or administered device IDs.

In some implementations, network device 120-1 may receive a data structure (e.g., a message) from computing device 110-1. The data structure may be intended for computing device 110-N. The data structure may include a source device ID and/or source protocol ID corresponding to computing device 110-1. The data structure may also, or alternatively, include a destination device ID and/or a destination protocol ID corresponding to computing device 110-N. In some implementations, the destination device ID may be the actual device ID (e.g., the MAC address) of computing device 110-N. However, in other implementations, the destination device ID may be an administered device ID associated with the actual device ID of computing device 110-N.

Network device 120-1 may modify the data structure. In some implementations, the data structure may include a data packet received from computing device 110. For example, in some implementations, network device 120-1 may insert a virtual network ID associated with the device ID of computing device 110-1. However, in other implementations, network device 120-1 may further modify the data structure by replacing the source device ID (e.g., the device ID of computing device 110-1) with an administered device ID associated with the device ID of computing device 110-1. Modifications to the data structure may be based on an edge directory of network device 120-1. Network device 120-1 may send the data structure to network device 120-N via network 130.

Network device 120-N may validate or authenticate the data structure. In some implementations, network device 120-N may do so by verifying that computing device 110-1 belongs to the same virtual network as computing device 110-N, which may include comparing virtual network IDs associated with computing device 110-1 and 110-N as contained in the data structure of the received data packet. For example, network device 120-N may compare a virtual network ID of the data structure with a virtual network ID associated with computing device 110-N. If the data structure is not authenticated, network device 120-N may disregard the data structure. However, if the data structure is authenticated, network device 120-N may send the data structure to computing device 110-N. In some implementations, network device 120-N may modify the data structure prior to sending the data structure to computing device 110-N. For example, in some implementations, network device 120-N may remove a virtual network ID of the data structure, while in other implementations, network device 120-N may also replace a destination device ID (which may be an administered device ID associated with computing device 110-N) with a device ID of computing device 110-N. Modifications to the data structure may be based on an edge directory of network device 120-N.

In some implementations, before computing device 110-1 is capable of sending a data structure to computing device 110-N, computing devices 110-1 may need to acquire a device ID of computing device 110-N or an administered device ID associated with computing device 110-N. In such implementations, network device 120-1 may receive a data structure corresponding to an ID resolution message from computing device 110-1. The data structure may include a source device ID and/or a source protocol ID corresponding to computing device 110-1. The data structure may also, or alternatively, include information corresponding to computing device 110-N, including a protocol ID of computing device 110-N.

Network device 120-1 may modify the data structure by inserting a virtual network ID corresponding to computing device 110-1. In some implementations, network device 120-1 may also modify the data structure by replacing a source device ID of the data structure with an administered device ID corresponding to computing device 110-1. Modifications to the data structure may be based on an edge directory maintained by network device 120-1. Network device 120-1 may communicate the data structure to network validation server 140.

Network validation server 140 may authenticate, or otherwise verify the authenticity of, the data structure. In certain implementations, authentication may be performed in response to one or more requests from computing devices 110 and/or network devices 120. In some implementations, this may also, or alternatively, include determining that computing devices 110-1 and 110-N belong to the same virtual network by, for example, comparing virtual network IDs associated with computing devices 110-1 and 110-N. In some implementations, the comparing of virtual network IDs may be executed in response to a request by computing device 110-1 for an address of computing device 110-N (or vice versa). In certain implementations, network validation server 140 may use a protocol ID of the data structure to obtain a device ID (or an administered device ID) associated with computing device 110-N from network address server 150. In some implementations, this may include one or more operations executed in accordance with IP over Ethernet Address Resolution Protocol (ARP). Network validation server 140 may also, or alternatively, use the device ID to identify a virtual network ID associated with computing device 110-N according to a network validation directory maintained by network validation server 140.

The virtual network ID of the data structure may be compared to the virtual network ID associated with computing device 110-N in order to validate or authenticate the data structure. If the data structure is not valid, network validation server 140 may disregard the data structure. However, if the data structure is valid, network validation server 140 may respond to the data structure by, for example, communicating a device ID (or administered device ID) of computing device 110-N to computing device 110-1. In some implementations, network validation server 140 and/or network address server 150 may operate in accordance with a network control plane by providing authentication services with respect to computing devices 110 and/or network devices 120 requesting network information, such as protocol identities. As described below, computing devices 110 and/or network devices 120 may cache network information in local directories for future communications to minimize control plane traffic.

The networks and devices of overview 100 may be capable of providing additional services, performing additional operations, or enabling additional network configurations. For example, computing devices 110 and/or network devices 120 may be capable of communicating ID announcement messages to, for example, update directories of the network validation server 140 and/or network address server 150. As another example, network devices 120 may request and/or provide message forwarding services for computing devices 110 that may have moved from one network device 120 to another network device 120. Additionally, network validation server 140 may enable the network directory of network address server 150 to be partitioned and distributed between multiple network address servers 150 based on virtual network IDs. Further, network validation server 140 may also be capable of routing messages, such as ID resolution messages, to an appropriate network address server 150 by associating network address servers 150 with one or more virtual network IDs.

Figure 2:
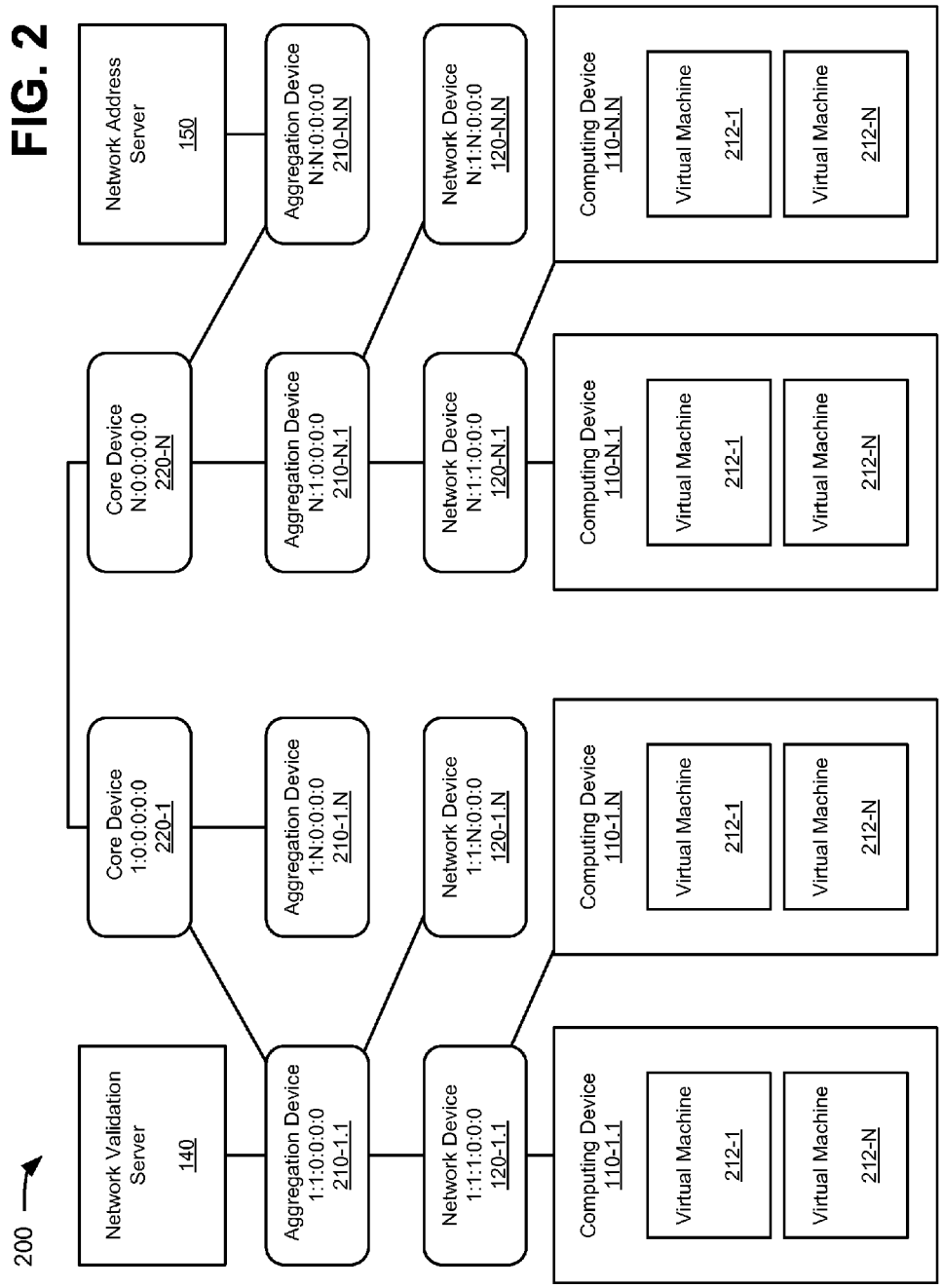
FIG. 2 is a diagram of an example environment in which systems and/or methods, described herein, may be implemented.

FIG. 2 is a diagram that illustrates an example environment 200 in which systems and/or methods, described herein, may be implemented. As shown in FIG. 2, environment 200 may include computing devices 110-1.1, 110-1.N, 110-N.1, ..., 110-N.N (collectively referred to as "computing devices 110," and individually as "computing device 110"), virtual machines 212-1, ..., 212-N (collectively referred to as "virtual machines 212," and individually as "virtual machines 212"), network devices 120-1.1, 120-1.N, 120-N.1, ..., 120-N.N (collectively referred to as "network devices 120," and individually as "network devices 120"), network validation server 140, network address server 150, aggregation devices 210-1.1, 210-1.N, 210-N.1, ..., 210-N.N (where N≥1) (collectively referred to as "aggregation devices 210," and individually as "aggregation devices 210"), and/or core devices 220-1, ..., 220-N (collectively referred to as "core devices 220," and individually as "core devices 220"). As discussed below, environment 200 may include a hierarchical switched network. While FIG. 2 shows a particular number and arrangement of networks and devices, in alternative implementations, environment 200 may include additional networks or devices, fewer networks or devices, different networks or devices, or differently arranged networks or devices than those depicted. For example, in some implementations, environment 200 may include a network with larger or smaller number of hierarchical levels.

As mentioned above, computing device 110 may include one or more computers, servers, or other computing devices capable of operating in a network environment. For example, computing device 110 may include hardware or a combination thereof, to send, receive, and/or process data using a variety of protocols. Examples of such protocols may include IP (e.g., IPv4 or IPv6), transmission control protocol (TCP), user datagram protocol (UDP), ARP, virtual machine interface (VMI) protocol, multiprotocol label switching (MPLS) protocol, cryptographic protocols (e.g., transport layer security (TLS)), secure socket layer (SSL) protocols, tunneling protocols (e.g., GRE), IP security protocols (e.g., IPsec), or other protocols. As depicted, computing device 110 may be capable of creating and maintaining multiple virtual machines 212.

Virtual machine 212 may include one or more virtualized computing devices operating within computing device 110. For example, virtual machine 212 may be a software version or implementation of a computer device capable of executing applications and operations. In some implementations, virtual machine 212 may provide a complete computing platform, including an operating system, software applications, communication protocols, device IDs, protocol IDs, or other characteristics of a physical computing device. Virtual machine 212 may also, or alternatively, include a device directory, which may include protocol IDs associated with device IDs and virtual network IDs (see, for example, FIGS. 6A-6B). Virtual machine 212 may be part of a virtual network, such as a VPN, a VLAN, or another type of virtual network. While virtual machine 212 may be a software implementation of a computing device, virtual machine 212 may also, or alternatively, be implemented using one or more hardware components of computing device 110. In some implementations, computing devices 110 and/or virtual machines 212 may be associated with device IDs (or administered device IDs) that are consistent with a hierarchal switched network. For example, in some implementations, a device ID associated with virtual machine 212 may include a portion (e.g., a prefix or suffix) of the device ID associated with computing device 110 corresponding to virtual machine 212.

As described above, network device 120 may include one or more gateways, routers, switches, hubs, or other devices capable of operating in a network environment. Network device 120 may include an edge directory that includes associations between device IDs, administered devices IDs, and/or virtual network IDs. In some implementations, information in an edge directory, such as the administered device IDs or virtual network IDs, may be preconfigured, remain static, and/or be manually entered or updated. In some implementations, information in an edge directory may be dynamically learned or otherwise maintained by communicating with other network devices, such as network validation server 140, which may include communicating via a secure protocol or taking other security measures.

As described above, network validation server 140 may include one or more computers, servers, or other computing devices. Network validation server 140 may be capable of operating in accordance with one or more of the protocols mentioned above with respect to computing device 110 and/or network device 120. Network validation server 140 may maintain a network validation directory of associations between administered device IDs and virtual network IDs. A network validation directory may be preconfigured, remain static, or be manually entered or updated. Additionally, or alternatively, information in a network validation directory may be dynamically learned or otherwise maintained by communicating with other network devices, which may include communicating via a secure protocol or taking other security measures.

In some implementations, a network validation directory may be maintained by a single network validation server 140, while in other implementations, different portions of a network validation directory may be maintained by different network validation servers 140. In certain implementations, copies (e.g., slave copies, multiple parallel copies, synchronized parallel copies, load balanced copies, etc.) of a network validation directory may be made available at various locations throughout network 130 in order to distribute load away from other copies (e.g., master copies). Additionally, or alternatively, synchronization between the master copies and the slave copies may be maintained using a multicast and/or unicast messages.

As described above, network address server 150 may include one or more computers, servers, or other computing devices. Network address server 150 may include a network directory that includes associations between protocol IDs and administered device IDs. In some implementations, a network directory may be maintained by a single network address server 150, while in other implementations, portions of the network directory may be maintained by different network address servers 150. In certain implementations, copies of the network directory may be made available at various locations throughout network 130. Additionally, synchronization between the master copies and the slave copies may be maintained using a multicast and/or unicast messages.

Aggregation devices 210 may include one or more of a variety of devices capable of operating in a network environment, including gateways, routers, switches, hubs, or other types of network devices. In some implementations, aggregation device 210 may be a switch used to aggregate data flows of network devices 120. Aggregation device 210 may be designed to participate in various network functions, including routing, filtering, or other network functions. In some implementations, aggregation device 210 may include a directory of network information corresponding to network devices 120 and/or core devices 220. As depicted, network validation server 140 and network address server 150 may be connected to aggregation devices 210.

Similarly, core device 220 may include one or more of a variety of devices capable of operating in a network environment. For example, core device 220 may include gateways, routers, switches, hubs, or other types of network devices. In some implementations, core device 220 may include network switches designed to provide high-volume routing services corresponding to a network backbone. In some implementations, core device 220 may include a directory of network information corresponding to aggregation devices 210.

Environment 200 may include a hierarchical switched network. For example, device IDs (e.g., MAC addresses) of network devices 120, aggregation devices 210, and core devices 220 may be rewritten in hierarchical form using administered device IDs (e.g., LAAs). For instance, the device ID of core device 220-1 may be rewritten as 1:0:0:0:0:0. Similarly, the device IDs of aggregation devices 210 under core device 220-1 may be rewritten as 1:1:0:0:0:0 and 1:N:0:0:0:0, and the device IDs of network devices 120 under aggregation device 210-1 may be rewritten as 1:1:1:0:0:0 and 1:1:N:0:0:0. As illustrated, the device IDs of other core devices 220-N, aggregation devices 210-N.1 and 210-N.N, and network devices 120-N.1 and 120-N.N may be arranged according to a similar hierarchy.

Figure 3:
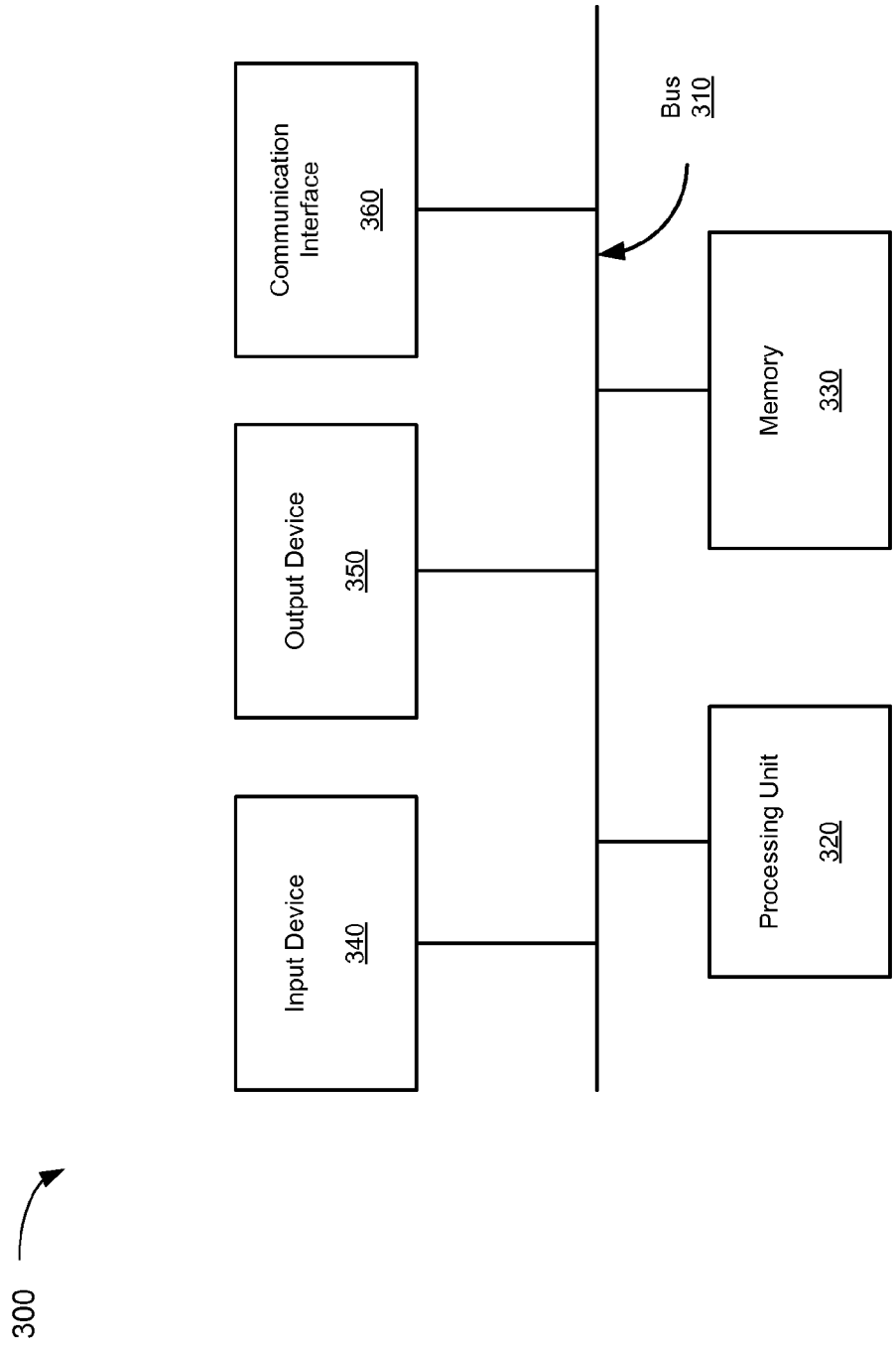
FIG. 3 is a diagram of example components of a device that may be used within the environment of FIG. 2.

FIG. 3 is a diagram of example components of a device 300 that may be used within environment of FIG. 2. For example, device 300, or one or more components thereof, may correspond to computing device 110, virtual machine 212, network device 120, network validation server 140, network address server 150, network aggregation device 210, and/or network core device 220. Each of computing device 110, virtual machine 212, network device 120, network validation server 140, network address server 150, network aggregation device 210, and/or network core device 220 may include one or more devices 300. As depicted, device 300 includes bus 310, processing unit 320, memory 330, input device 340, output device 350, and communication interface 360. However, the precise components of device 300 may vary between implementations. For example, depending on the implementation, device 300 may include fewer components, additional components, different components, or differently arranged components than those illustrated in FIG. 3.

Bus 310 may permit communication among the components of device 300. Processing unit 320 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processing unit 320 may control the overall operation, or a portion thereof, of device 300, based on, for example, an operating system (not illustrated) and/or various applications. Processing unit 320 may access instructions from memory 330, from other components of device 300, or from a source external to device 300 (e.g., a network or another device).

Memory 330 may include memory and/or secondary storage that stores data, applications, or operations related to the operation of device 300. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices (e.g., computing devices 110, virtual machines 212, network devices 120, network validation server 140, network address server 150, aggregation devices 210, core devices 220, etc.) or networks (e.g., network 130). For example, communication interface 360 may include some type of wireless or wired interface. Communication interface 330 may also include an antenna (or a set of antennas) that permits wireless communication, such as the transmission and reception of radio frequency (RF) signals.

As described herein, device 300 may perform certain operations in response to processing unit 320 executing software instructions contained in a computer-readable medium, such as memory 330. The software instructions may be read into memory 330 from another computer-readable medium or from another device via communication interface 360. The software instructions contained in memory 330 may cause processing unit 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
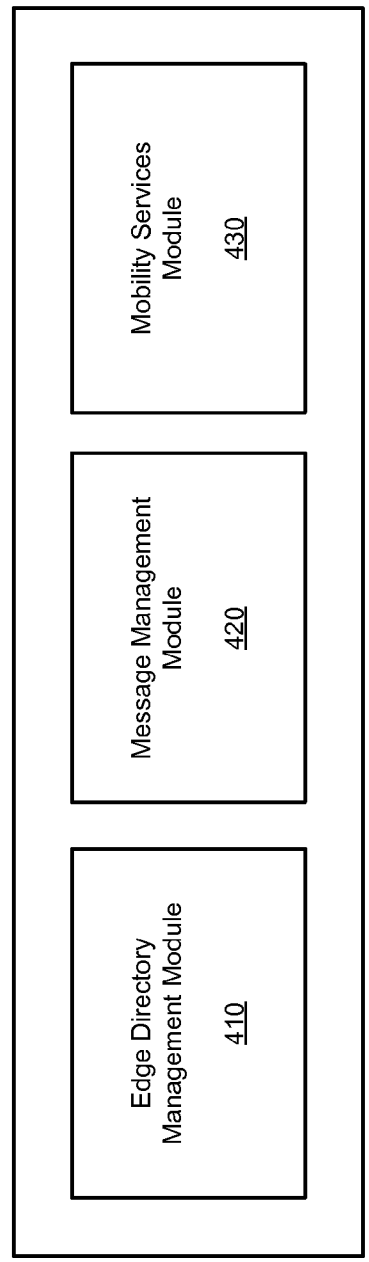
FIG. 4 is a diagram of example functional components of a network device that may be used within the environment of FIG. 2.

FIG. 4 is a diagram of example functional components of network device 120 that may be used within the environment of FIG. 2. As illustrated, network device 120 may include edge directory management module 410, message management module 420, and/or mobility services module 430. Depending on the implementation, one or more of the modules 410-430 may be implemented as a combination of hardware and software based on the components illustrated and described with respect to FIG. 3. Alternatively, modules 410-430 may each be implemented as hardware based on the components illustrated and described with respect to FIG. 3. While FIG. 4 shows a particular number and arrangement of modules, in alternative implementations, network device 120 may include additional modules, fewer modules, different modules, or differently arranged modules than those depicted. FIG. 4 will be described with corresponding references to FIGS. 5-6B.

Edge directory management module 410 may manage, or enable the management of, one or more edge directories. For example, edge directory management module 410 may enable network device 120 to add, remove, edit, or look up data in an edge directory. As mentioned above, an edge directory may include a variety of data, including device IDs, administered device IDs, and/or virtual network IDs.

FIG. 5 is a diagram of example devices and data structures 500 corresponding to one or more implementations described herein. As illustrated, network device 120-AA may be connected to multiple computing devices 110-AA-1, . . . , 110-AA-N (collectively referred to as "computing devices 110," and individually as "computing device 110"). Similarly, each computing device 110 may include multiple virtual machines 212-AA-1.1, . . . , 212-AA-1.N, and 212-AA-N.1, . . . , 212-AA-N.N (collectively referred to as "virtual machines 212," and individually as "virtual machine 212"), and each virtual machine 212 may include a protocol ID and a device ID. The devices of FIG. 5 are referenced using the symbol "AA," while the protocol IDs are referenced using the symbol "A.A," and the device IDs are referenced using the symbol "A:A." The use of these symbols is to highlight the interrelationship between the depicted devices (e.g., network device 120, computing devices 110, and virtual machines 212) and data structures (e.g., the protocol IDs and the device IDs) and to later distinguish the depicted devices and data structures from some of the devices and data structures in FIGS. 6A-6B, which are referenced using corresponding symbols "BB," "B.B," and "B:B."

As shown, an edge directory may include a device ID, an administered device ID, and a virtual network ID corresponding to each virtual machine 212. For example, virtual machine 212-AA-1.1 includes a device ID of "A:A:1:1," and the edge directory includes a corresponding record for device ID "A:A:1:1:," which is associated with administered device ID "1:1:1:0:0:a" and virtual network ID "V.1." In certain implementations, the edge directory of network device 120 may include additional information, including protocol IDs, device IDs (e.g., authenticated, virtual network IDs), and/or administered device IDs of network validation server 140, network address server 150, aggregation devices 210, core devices 220, and/or other network device information.

In some implementations, the administered device IDs for each virtual machine 212 may correlate with the administered device ID of network device 120. For example, the administered device ID of network device 120 may be "1:1:1:0:0:0," and the administered device ID associated with the device ID "A:A:1:1" (virtual machine 212-AA-1.1) may be "1:1:1:0:0:a." Additionally, or alternatively, virtual machines 212 corresponding to different computing devices 110 may be associated with the same virtual network. For example, virtual machine 212-AA-1.1 may correspond to computing device 110-AA-1, and virtual machine 212-AA-N.1 may correspond to computing device 110-AA-N; nevertheless, both virtual machines 212-AA-1.1 and 212-AA-N.1 may correspond to, or be part of, virtual network "V.1," as depicted in the edge directory, which may be stored, contained, or otherwise maintained by network device 120.

Returning to FIG. 4, message management module 420 may modify, or enable the modification of, data structures relating to incoming or outgoing communications. For example, message management module 420 may enable network device 120 to modify a data structure (e.g., a message or packet) originating from virtual machine 212 by modifying a source device ID and/or inserting or validating a virtual network ID. Additionally, or alternatively, message management module 420 may enable network device 120 to authenticate a data structure and/or modify a destination device ID of the data structure.

Depending on the implementation, a data structure may correspond to a variety of different operations and/or communications. For example, in some implementations, a data structure may correspond to a message being sent from one virtual machine 212 to another virtual machine 212. In other implementations, a data structure may correspond to an ID resolution message being sent from virtual machine 212 to network validation server 140. In yet other implementations, a data structure may correspond to an ID announcement message (e.g., a gratuitous ARP message) or a message forwarding operation. An example is discussed below in the context of a data structure being communicated from a virtual machine 212 of one network device 120 to the virtual machine 212 of another network device 120.

Figure 6A:
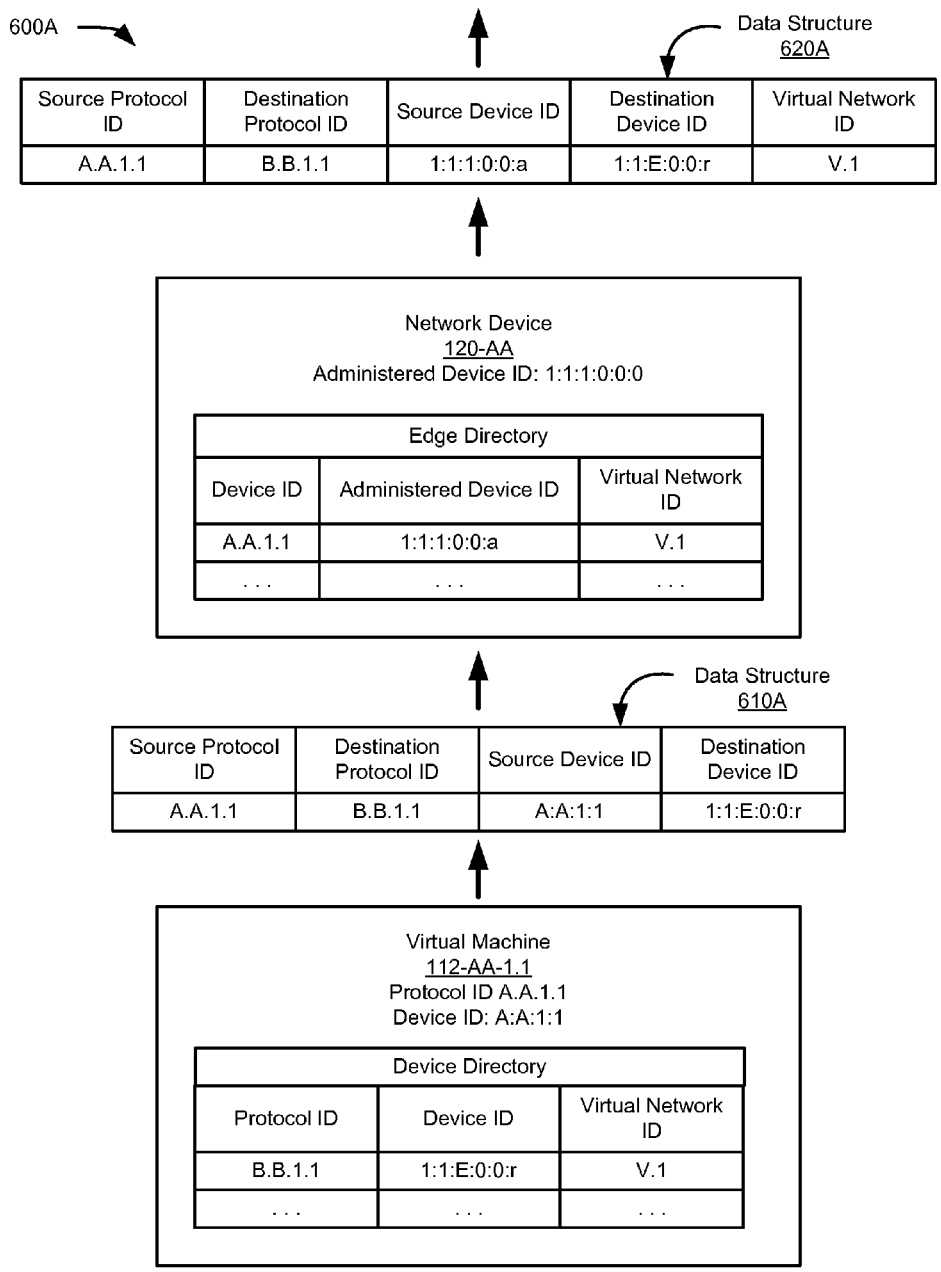
FIGS. 6A-6B are diagrams of example devices and data structures corresponding to one or more implementations described herein.
Figure 6B:
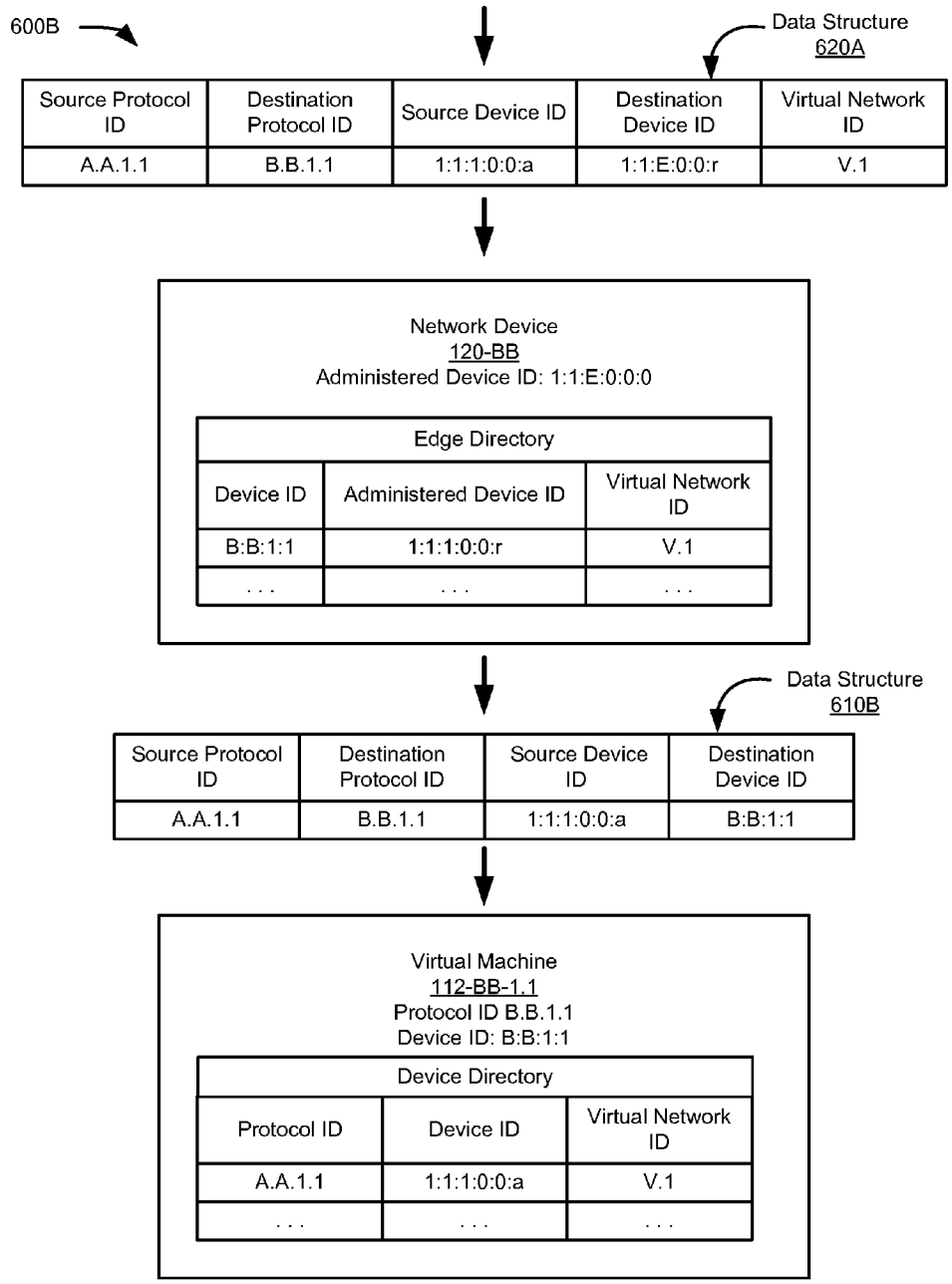

FIGS. 6A-6B are diagrams of example devices and data structures 600A and 600B corresponding to one or more implementations described herein. As illustrated, virtual machine 212-AA-1.1 may generate data structure 610A that includes a source protocol ID, a destination protocol ID, a source device ID, and a destination device ID. The source protocol ID "A.A.1.1" may correspond to a protocol ID of virtual machine 212-AA-1.1, and the destination protocol ID "B.B.1.1" may correspond to a destination protocol ID stored in a device directory of virtual machine 212-AA-1.1. Similarly, the source device ID "A:A:1:1" may correspond to a device ID of virtual machine 212-AA-1.1, and the destination device ID "1:1:E:0:0:r" may correspond to a device ID stored in the device directory of virtual machine 212-AA-1.1. The destination protocol ID may be the protocol ID of virtual machine device 212-BB-1.1, and the destination device ID may be an administered device ID associated with the device ID of virtual machine 212-BB-1.1.

Network device 120-AA may modify data structure 610A. For example, network device 120-AA may replace the source device ID "A:A:1:1" and with a new source device ID "1:1:1:0:0:a" based on an edge directory maintained by network device 120-AA, as depicted in data structure 620A. The new source device ID "1:1:1:0:0:a" may be an administered device ID associated with the device ID "A:A:1:1" of virtual machine 212-AA-1.1. The administered device ID "1:1:1:0:0:a" may correlate with the administered device ID "1:1:1:0:0:0" of network device 120-AA, according to a hierarchal switching network arrangement. Network device 120-AA may also, or alternatively, insert a virtual network ID "V.1." Similar to the administered device ID "1:1:1:0:0:a," the virtual network ID "V.1" may also be associated with the device ID "A:A:1:1" of virtual machine 212-AA-1.1 in the edge directory of network device 120-AA.

Referring to FIG. 6B, data structure 620A may be received by network device 120-BB. In some implementations, data structure 620A may be delivered via one or more interconnected aggregation devices 210 and/or core network devices 220 (see, for example, FIG. 2) As depicted, the destination device ID "1:1:E:0:0:r" of data structure 620A may correlate with the administered device ID "1:1:E:0:0:0" of network device 120-BB, according to a hierarchal switching network arrangement. Network device 120-BB may verify the authenticity of data structure 620A. In some implementations, network device 120-BB may do so by determining whether the destination device ID "1:1:E:0:0:r" and the virtual network ID "V.1" in data structure 620A correspond to an administered device ID "1:1:E:0:0:r" and virtual network ID "V.1" in the edge directory of network device 120-BB. In some implementations, a virtual network ID may indicate membership in one or more virtual networks. In some implementations, membership in multiple networks may be achieved by, for example, using specific bit ranges, a structuring of the virtual network ID space, cryptographic methods, or hashing.

If data structure 620A is not authenticated, network device 120-BB may disregard data structure 620A. In some implementations, network device 120-BB may authenticate data structure 620A by comparing the virtual network ID included in data structure 620A with a corresponding virtual network ID stored in the edge directory of network device 120-BB. However if data structure 620A is authenticated, network device 120-BB may modify data structure 620A. For example, as illustrated, network device 120-BB may remove the virtual network ID "V.1" and replace the destination device ID "1:1:E:0:0:r" with a new destination device ID "B:B:1:1." The new destination device ID "B:B:1:1" may be the device ID of virtual machine 212-BB-1.1. In some implementations, these modifications may be based on the edge directory of network device 120-BB. Network device 120-BB may send data structure 610B to virtual machine 212-BB-1.1, and virtual machine 212-BB-1.1 may update a device directory with the source protocol ID "A.A.1.1" and/or the source device ID "1:1:1:0:0:a" of data structure 610B.

Returning to FIG. 4, mobility services module 430 may provide, or enable, services regarding new devices (e.g., computing devices 110 or virtual machines 212) connecting to network device 120 or existing devices (e.g., computing devices 110 or virtual machines 212) moving from one network device 120 to another network device 120 or between computing devices connected to the same network device 120. For example, mobility services module 430 may enable network device 120 to update an edge directory of network device 120 when an additional computing device 110 or virtual machine 212 connects to network device 120. In some implementations, this may include the creation of a new record in the edge directory or an update to a device ID, an administered device ID, or a virtual network ID in the edge directory. Additionally, or alternatively, mobility services module 430 may enable network device 120 to execute an ID resolution message, an ID announcement message, or one or more forwarding operations. These and other operations are described below in additional detail with respect to FIGS. 11-12.

Figure 7:
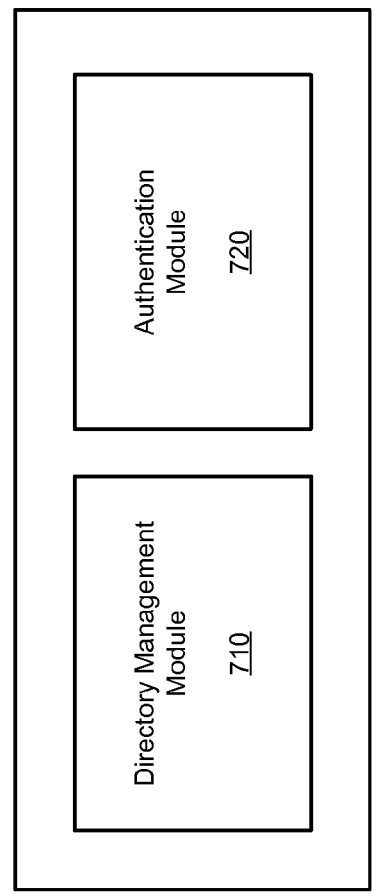
FIG. 7 is a diagram of example functional components of a network validation server that may be used within the environment of FIG. 2.

FIG. 7 is a diagram of example functional components of a network validation server 140 that may be used within the environment of FIG. 2. As illustrated, network validation server 140 may include directory management module 710 and authentication module 720. Depending on the implementation, one or more of the modules 710-720 may be implemented as a combination of hardware and software based on the components illustrated and described with respect to FIG. 3. Alternatively, modules 710-720 may each be implemented as hardware based on the components illustrated and described with respect to FIG. 3. While FIG. 7 shows a particular number and arrangement of modules, in alternative implementations, network validation server 140 may include additional modules, fewer modules, different modules, or differently arranged modules than those depicted. FIG. 7 will be described with corresponding references to FIGS. 8A-8B.

Directory management module 710 may manage, or enable the management of, a network validation directory. For example, directory management module 710 may enable network validation server 140 to add, remove, edit, or look up data in a network validation directory. Depending on the implementation, directory management module 710 may enable a network validation directory to be managed manually and/or dynamically. For example, in some implementations, directory management module 710 may enable network validation server 140 to update a network validation directory based on ID announcement messages from one or more computing devices 110, virtual machines 212, or network devices 120. In some implementations, network validation server 140 may update a network validation directory by mapping a protocol ID to an appropriate device ID and/or administered device ID. In certain implementations, directory management module 710 may enable a network validation directory to be edited, updated, configured, or otherwise modified by an operator. As mentioned above, a network validation directory may include a variety of data, including administered device IDs associated with virtual network IDs.

FIG. 8A is a diagram of example devices 800A corresponding to one or more implementations described herein. As illustrated, devices 800 include network devices 120 and network validation server 140. Network devices 120 each include edge directories, and network validation server 140 includes a network validation directory. The network validation directory includes a record for each administered device ID and virtual network ID listed in the edge directories of network devices 120. In some implementations, the uniqueness of each record in the network validation directory may be based on the administered device ID. However, in other implementations, the uniqueness of each record in the network validation directory may be based on a combination of the administered device ID and the corresponding virtual network ID.

Returning to FIG. 7, authentication module 720 may authenticate, or enable the authentication of, a data structure (e.g., an ID resolution message, an ID announcement message, etc.). In certain implementations, network validation server 140 may use a destination protocol ID of the data structure to obtain a device ID (or an administered device ID) associated with the destination protocol ID. In some implementations, this may include communicating the protocol ID to a network address server 150 and receiving, from network address server 150 in response, the device ID (or administered device ID).

The network validation server 140 may use the device ID (or administered device ID) to identify a virtual network ID and compare the virtual network ID with a virtual network ID of the data structure. The network validation server 140 may determine that the data structure is authenticated when the virtual network IDs match (e.g., when the virtual network IDs correspond to the same virtual network). If the data structure is not authenticated, network validation server 140 may disregard the data structure. However, if the data structure is authenticated, network validation server 140 may respond to the data structure by, for example, updating a network validation directory or providing a computing device 110 that originated the data structure with the device ID (or administered device ID) received from network address server 150.

FIG. 8B is a diagram of example devices 800B corresponding to one or more implementations described herein. As illustrated, devices 800 include network validation server 140 and network address server 150. Network validation sever 140 is described above with respect to FIG. 8A. Network address server 150 may include a network directory that associates administered device IDs to protocol IDs. Network address server 150 may receive updates to the network directory through control messaging (e.g., IP over ARP) from computing devices 110, virtual machines 212, and/or network devices 120.

As mentioned above, in some implementations, network validation server 140 may receive a request for an administered device ID associated with a protocol ID. The request may originate from various devices, such as computing devices 110, virtual machines 212, and/or network devices 120. In such implementations, since the network directory of network address server includes administered device IDs associated with protocol IDs, network validation server 140 may provide the protocol ID of the request to network address server 150, and network address server 150 may return the administered device ID associated with the protocol ID to network validation server 140.

In some implementations, before responding to the request with the administered device ID, network validation server 140 may determine whether the request is authentic. For example, network validation server 140 may access the network validation directory to obtain the virtual network ID associated with the administered device ID and compare the virtual network ID with a virtual network ID included in the request. If the virtual network IDs match, network validation server 140 may respond to the request with the administered device address as requested. However, if the virtual network IDs do not match, network validation server 140 may ignore or otherwise disregard the request.

Similarly, in some implementations, network address server 150 may receive a request for an administered device ID. The request may originate from a computing device 110, a virtual machine 212, or a network device 120. In such implementations, network address server 150 may communicate with network validation server 140 to have the request authenticated before responding to the request with the administered device address. Accordingly, network validation server 140 and network address server 150 may cooperate and communicate in a variety of ways to respond to requests for network information, authenticate requests for network information, and maintain updated directories.

Figure 9:
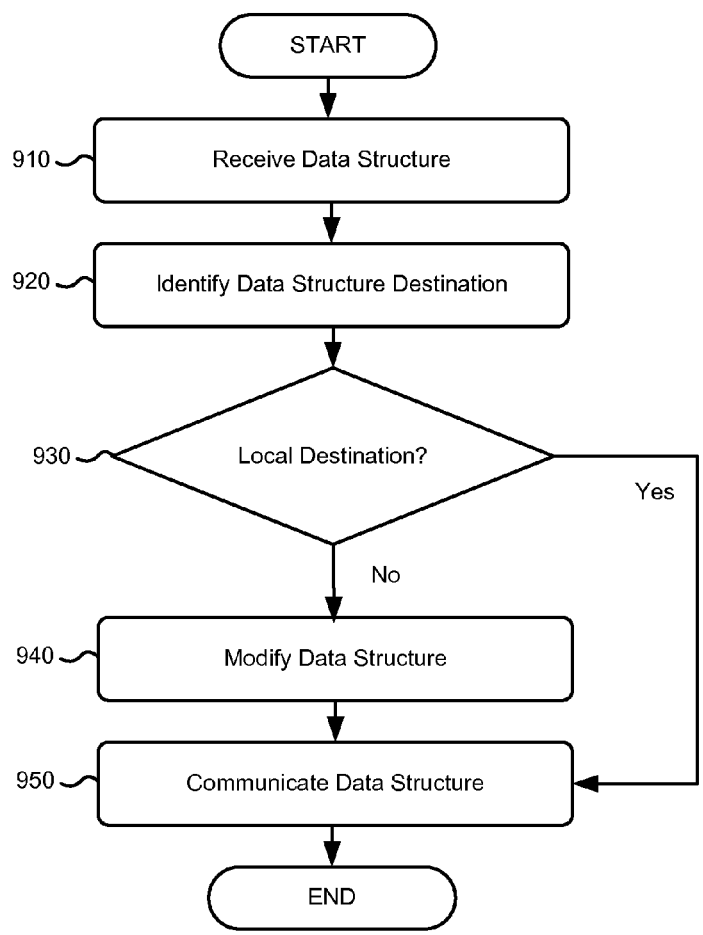
FIG. 9 is a flowchart of an example process for modifying a data structure.

FIG. 9 is a flowchart of an example process 900 for modifying a data structure. In one or more implementations, process 900 may be performed by one or more components of network device 120. In other implementations, one or more blocks of process 900 may be performed by one or more other components/devices, or a group of components/devices, including or excluding network device 120.

Process 900 may include receiving a data structure (block 910). For example, network device 120 may receive a data structure from computing device 110. As mentioned above, a data structure may include a source protocol ID, a destination protocol ID, a source device ID, and/or a destination device ID. A data structure may correspond to one or more of a variety of data structures, such as an IP packet, intended for one or more network devices, such as another computing device 110, virtual machine 212 or network validation server 140. For example, the data structure may correspond to an ID resolution message (e.g., an ARP message) intended for network validation server 140, address server 150, and/or network 130. In another example, the data structure may be part of an ID announcement message (e.g., a gratuitous ARP message) intended for network validation server 140, network address server 150, and/or network 130. In yet another example, the data structure may be a message from one computing device 110 to another computing device 110.

A destination of the data structure may be identified (block 920). For example, network device 120 may inspect a data structure to identify an intended destination corresponding to the data structure. In some implementations, this may include identifying a destination device ID and/or a destination protocol ID. As mentioned above, in some implementations, a device ID may include a MAC address and a protocol ID may include an IP address. Network device 120 may also determine whether the intended destination is local (e.g., if the intended destination is located on the same side of network 130 as the source of the data structure). This may include accessing one or more edge directories maintained by network device 120.

In some implementations, if the intended destination of the data structure is local (block 930—Yes), network device 120 may communicate the data structure to the intended destination (block 950). However, if the data structure is not intended for a local destination (block 930—No), network device 120 may modify the data structure (block 940). For example, network device 120 may replace a source device ID in the data structure with an administered device ID and/or insert a virtual network ID into the data structure. In some implementations, the modifications may be based on an edge directory managed and maintained by network device 120 (see, for example, FIG. 6A).

As mentioned above, a data structure may be communicated (block 950). For example, network device 120 may send, forward, route, or otherwise communicate a data structure according to a destination device ID of the data structure and/or a destination protocol ID of the data structure. In some implementations, network device 120 may communicate the modified data structure over network 130, which may include a variety of one or more networks including a hierarchical switched Ethernet network (see, for example, FIG. 2).

While FIG. 9 shows a flowchart diagram of an example process 900 for modifying data structures, in other implementations, a process for modifying data structures may include fewer operations, different operations, differently arranged operations, or additional operations than depicted in FIG. 9.

Figure 10:
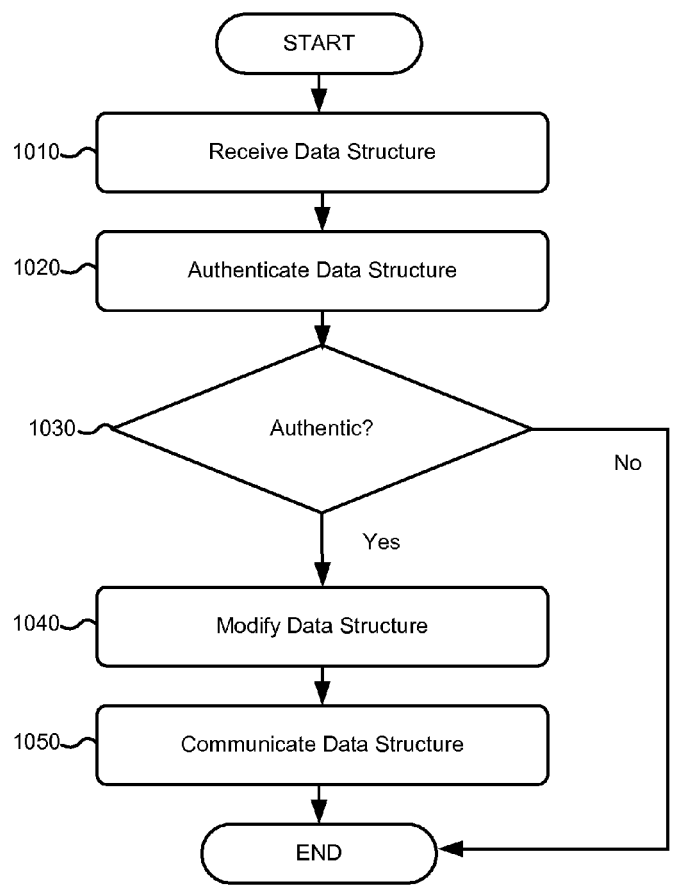
FIG. 10 is a flowchart of an example process for authenticating a data structure.

FIG. 10 is a flowchart of example process 1000 for authenticating a data structure. In one or more implementations, process 1000 may be performed by one or more components of network device 120. In other implementations, one or more blocks of process 1000 may be performed by one or more other components/devices, or a group of components/devices, including or excluding network device 120.

Process 1000 may include receiving a data structure (block 1010). For example, network device 120 may receive a data structure, from network 130, intended for computing device 110 or virtual machine 212 that is locally connected to network device 120. As mentioned above, a data structure may include a source protocol ID, a destination protocol ID, a source device ID, and/or a destination device ID (see, for example, FIG. 6A). The data structure may correspond to one or more of a variety of network communications, including a message from a remote computing device 110 or a remote virtual machine 212.

The data structure may be authenticated (block 1020). For example, network device 120 may operate to validate, authenticate, or otherwise verify the identity of a data structure. In some implementations, network device 120 may verify the authenticity of a data structure by comparing one or more portions of the data structure with locally stored data and/or performing other computations on the received data structure. For instance, network device 120 may compare a virtual network ID of the data structure with a virtual network ID associated with a destination device ID (e.g., a device ID or an administered device ID) of the data structure. As described above, network device 120 may identify the virtual network ID associated with the destination device ID by accessing an edge directory of network device 120 (see, for example, FIG. 6B).

In some implementations, if the data structure is not authenticated (block 1030—No), network device 120 may ignore or otherwise disregard the data structure. However, if the data structure is authenticated (block 1030—Yes), network device 120 may modify the data structure (block 1040). In some implementations, network device 120 may modify the data structure in one or more of a variety of ways. For example, network device 120 may remove an administered device ID in a destination device field of the data structure and replace the administered device ID with a device ID, that is locally significant, corresponding thereto. Network device 120 may also, or alternatively, remove a virtual network ID from the data structure (see, for example, FIG. 6B).

The data structure may be communicated (block 1050). For example, network device 120 may communicate a data structure in accordance with a destination protocol ID and/or destination device ID in the data structure. In some implementations, the data structure may be communicated to a computing device 110 or virtual machine 212 locally connected to network device 120.

While FIG. 10 shows a flowchart diagram of an example process 1000 for authenticating a data structure, in other implementations, a process for authenticating a data structure may include fewer operations, different operations, differently arranged operations, or additional operations than depicted in FIG. 10.

Figure 11:
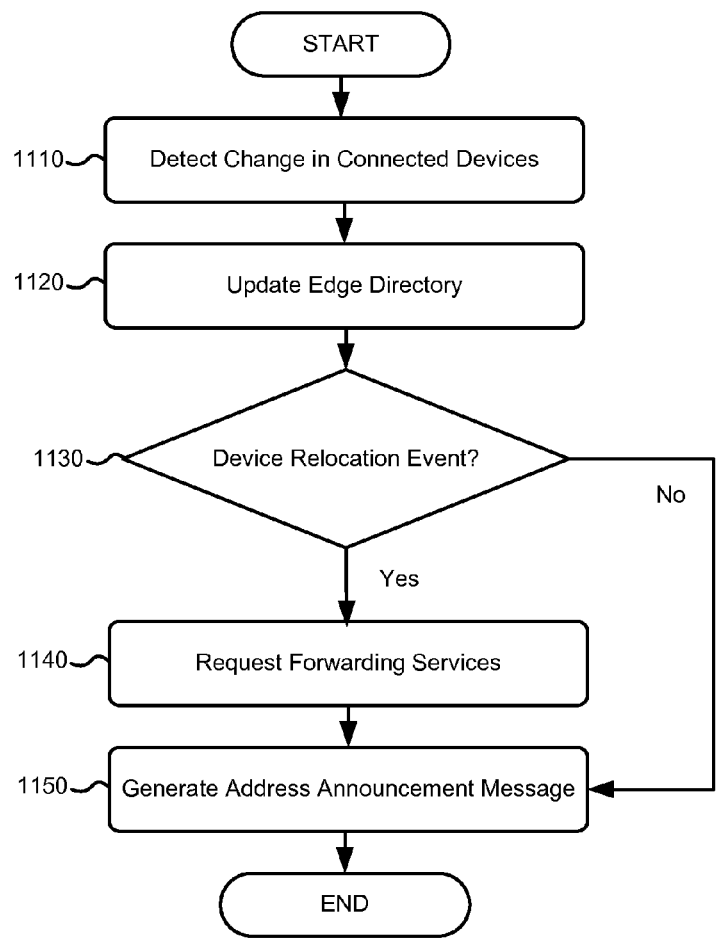
FIG. 11 is a flowchart of an example process for providing mobility services.

FIG. 11 is a flowchart of an example process 1100 for providing mobility services. In one or more implementations, process 1100 may be performed by one or more components of network device 120. In other implementations, one or more blocks of process 1100 may be performed by one or more other components/devices, or a group of components/devices, including or excluding network device 120.

Process 1100 may include detecting a change in connected devices (block 1110). For example, network device 120 may monitor and detect changes in locally connected devices, such as computing devices 110 and virtual machines 212. Examples of such changes may include a change in a device currently connected to network device 120 (e.g., a change in a protocol ID or device ID), a device disconnecting from network device 120, or a device connecting to network device 120. In some implementations, detecting a change in a connected device may include identifying the type of change and/or determining data corresponding to the change. For example, network device 120 may identify one or more protocol IDs, device IDs, administered devices IDs, and/or virtual network IDs associated with a change in connected devices. In another example, detecting a change in connected devices may include detecting an update to validation server 140 and/or address server 150, which may result in an update to one or more edge directories of network devices 120 involved in a virtual network that is relevant to the update.

An edge directory may be updated (block 2120). For example, network device 120 may update an edge directory that is managed and maintained by network device 120. In some implementations, network device 120 may update an edge directory in a manner that is consistent with the change in connected device. For instance, if computing device 110 were newly connected to network device 120, an edge directory may be updated to add one or more protocol IDs, device IDs, administered devices IDs, and/or virtual network IDs associated with computing device 110. Alternatively, if computing device 110 were disconnected from the network device 120, the edge directory may be updated by removing one or more protocol IDs, device IDs, administered devices IDs, and/or virtual network IDs associated with computing device 110. As mentioned above, an edge directory of network device 120 may be updated in response to an update to validation server 140 and/or address server 150 that is relevant to the edge directory (e.g., an update regarding a virtual network represented in the edge directory by a virtual network ID).

A determination may be made whether the detected change in connected devices is a device relocation event (block 1130). A device relocation event may include a scenario where a device, such as computing device 110 or virtual machine 212, was previously connected to one network device 120 but has been moved or reassigned to another network device 120. In some implementations, a device relocation event may include a device being assigned a different virtual network or different virtual network ID. Determining whether a device relocation event has occurred may include a number of operations, including network device 120 communicating with the relocated device (e.g., computing device 110 or virtual machine 212), another network device 120, network validation server 140, network address server 150, or another network device.

In some implementations, if a device relocation event has not occurred (block 1130—No), an ID announcement message may be generated (block 1150). However, if a device relocation event has occurred (block 1130—Yes), a request for forwarding services may be made (block 1140). For example, network device 120 may communicate a request for forwarding services to the network device 120 previously connected to relocated computing device 110 or virtual machine 212. In some implementations, a request for forwarding services may include communicating a protocol ID, a device ID, and/or an administered device ID associated with the relocated device. The network device 120 receiving the request for forwarding services may associate new ID information with the relocated computing device 110 or virtual machine 212 and forward information intended for the relocated computing device 110 or virtual machine 212 using the new ID information. Additionally, or alternatively, validation server 140 may use the virtual network ID to map or identify administered device IDs associated with the relevant virtual network and use the hierarchical nature of the administered device IDs to determine the network devices 120 that require updating because of the movement of the virtual machine 212.

As mentioned above, an ID announcement message may be generated (block 1150). An ID announcement message may include a message intended to update one or more network devices 120, network validation server 140, and/or network address server 150. For example, network device 120 may communicate an ID announcement message intended to update network validation server 140 and network address server 150 regarding the device relocation event. In some implementations, an ID announcement message may be a gratuitous ARP message.

While FIG. 11 shows a flowchart diagram of an example process 1100 for providing mobility services, in other implementations, a process for providing mobility services may include fewer operations, different operations, differently arranged operations, or additional operations than depicted in FIG. 11.

Figure 12:
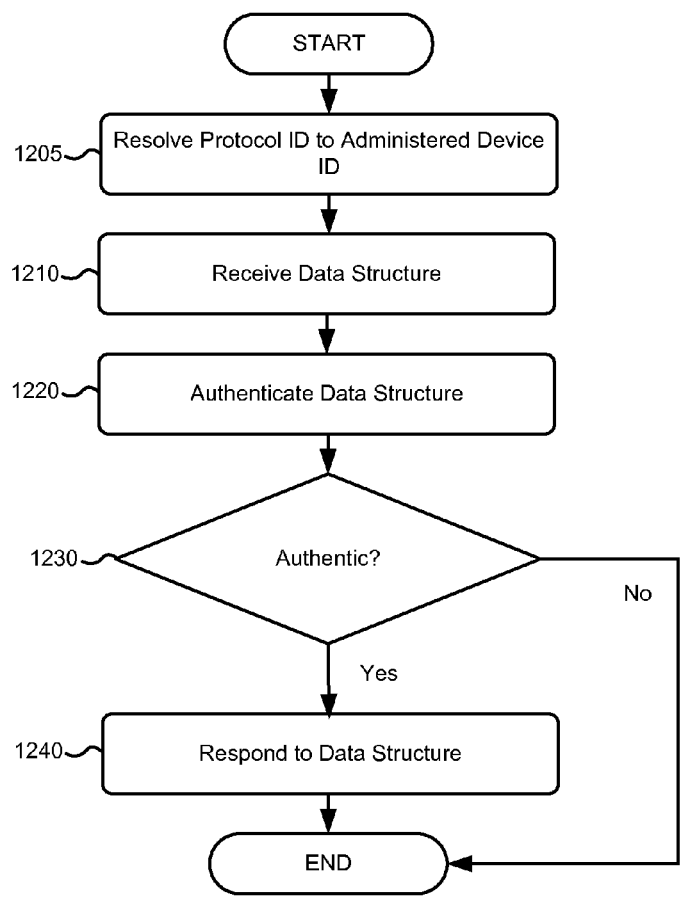
FIG. 12 is a flowchart of an example process for responding to a data structure.

FIG. 12 is a flowchart of an example process 1200 for responding to a data structure. In one or more implementations, process 1200 may be performed by one or more components of network validation server 140. In other implementations, one or more blocks of process 1200 may be performed by one or more other components/devices, or a group of components/devices, including or excluding network validation server 140.

Process 1200 may include resolving a protocol ID to an administered device ID (block 1205). For example, network address server 150 may receive a protocol ID and map the protocol ID to an administered device ID. As discussed above with reference to FIG. 8B, network address server 150 may communicate and/or otherwise cooperate with network validation server 140 in various ways, including the mapping of various IDs and/or the authentication of various data structures.

Process 1200 may include receiving a data structure (block 1210). For example, network validation server 140 may receive a data structure (e.g., a message) from network device 120, computing device 110, or virtual machine 212. In some implementations, the data structure may include a message requesting ID information corresponding to one or more devices (e.g., an ARP message). In some implementations, the data structure may include a message announcing the ID information corresponding to one or more network devices (e.g., an ARP announce message or a gratuitous ARP message). Depending on the implementation, the data structure may include a source protocol ID, a source device ID, a destination protocol ID, a destination device ID, and/or a virtual network ID.

The data structure may be authenticated (block 1220). For example, network validation server 140 may perform one or more operations to verify the authenticity of a data structure. In certain implementations, network validation server 140 may use a destination protocol ID of the data structure to obtain a device ID (or an administered device ID) associated with the destination protocol ID. In some implementations, the network validation server 140 may do so by communicating the destination protocol ID to a network address server 150 and receiving from network address server 150 in response, the device ID (or administered device ID). In certain implementations, network address server 150 may determine an administered device ID and consult with validation server 140 to authenticate a virtual network ID. The network validation server 140 may use the device ID (or administered device ID) to identify a virtual network ID and compare the virtual network ID with a virtual network ID of the data structure. The network validation server 140 may determine that the data structure is authenticated when the virtual network IDs match. In other implementations, network validation server 140 may authenticate the data structure in other ways. For instance, the data structure may be an ID announcement message, and network validation server 140 may authenticate the data structure by ensuring that the data structure includes security information corresponding to one or more security protocols.

In some implementations, if the data structure is not authenticated (block 1230—No), network validation server 140 may ignore or otherwise disregard the data structure. However, if the data structure is authenticated (block 1230—Yes), network validation server 140 may respond to the data structure in various ways (1240). For example, if the data structure corresponds to an ID resolution message, network validation server 140 may respond by providing a device ID (or administered device ID) associated with a destination protocol ID of the data structure to a computing device 110, virtual machine, network device 120, or other device that originated the data structure.

Alternatively, if the data structure is an ID announcement message, network validation server 140 may respond by updating a network validation directory managed by network validation server 140. Updating the network validation directory may include inserting an administered device ID and a virtual network ID of the data structure into the network validation directory. In some implementations, network validation server 140 may communicate the ID announcement message to network address server 150 in order for network address server 150 to be properly updated by the ID announcement message (block 1240).

While FIG. 12 shows a flowchart diagram of an example process 1200 for responding to a data structure, in other implementations, a process for responding to a data structure may include fewer operations, different operations, differently arranged operations, or additional operations than depicted in FIG. 12.

Accordingly, scalability in virtual networks may be increased by associating computing devices with virtual networks for authentication purposes. For instance, a network device may receive a message from a computing device of a virtual network. The network device may modify the message to include an ID of the virtual network. The virtual network ID may be used by other network devices to authenticate the message. In some implementations, scalability may be enhanced by network devices 120 maintaining only information for virtual networks corresponding to locally connected computing devices 110 and/or virtual machines 212.

The foregoing description of implementations provides illustrations and descriptions, but is not intended to be exhaustive or to limit implementations described herein to the precise form disclosed. Modifications and variations are possible in light of the above teachings or may be acquired from practice of the implementations.

For example, while series of blocks have been described with regard to FIGS. 9-12, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" or "module" that performs one or more functions. These components or modules may include hardware, such as an ASIC or a FPGA, or a combination of hardware and software.

Even though particular combinations of features are recited in the claims and/or disclosed in the specification, these combinations are not intended to limit the implementations. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a network device, a first data structure from a first computing device, the first data structure including an identifier (ID) of a virtual network, an ID of the first computing device, and an ID of a second computing device;

identifying the second computing device as a destination of the first data structure based on the ID of the second computing device;

authenticating, by the network device, the first data structure when it is determined that the first computing device and the second computing device correspond to the same virtual network; and performing at least one of modification of the first data structure by replacing the ID of the second computing device with a locally administered ID of the second computing device, or modification of the first data structure by removing the ID of the same virtual network from the first data structure, and communicating, by the network device, the first data structure to the second computing device, before communicating, by the network device, the modified first data structure to the second computing device.

2. The method of claim 1, where:

determining that the first computing device and the second computing device correspond to the same virtual network comprises:
- accessing a directory that associates computing devices with virtual networks,
- identifying a second virtual network corresponding to the second computing device based on the first data structure and the directory, and
- determining that the first virtual network corresponding to the first computing device is the same as the second virtual network corresponding to the second computing device.

3. The method of claim 1, further comprising:

receiving a second data structure from the second computing device, where the first computing device is a destination of the second data structure;

accessing a directory that associates computing devices with virtual private networks;

modifying the second data structure, based on the second data structure and the directory, to indicate a virtual private network corresponding to the second computing device; and communicating the second data structure to the first computing device.

4. The method of claim 3, where the directory also associates computing devices with locally administered device IDs, and modifying the second data structure comprises:
- replacing a device ID corresponding to the second computing device with a locally administered device ID associated with the second computing device.

5. A system, comprising:

a memory to store one or more instructions; and a processor to execute the instructions to:
- receive a first data structure comprising a first virtual network identifier (ID), a source device ID, and a destination device ID;
- identify a second virtual network ID based on the destination device ID;
- authenticate the first data structure based on the first virtual network ID and the second virtual network ID; and
- perform at least one of modification of the first data structure by replacing the ID of the destination device with a locally administered ID of the destination device, or modification of the first data structure by removing the first virtual network ID from the first data structure, and communicate the first data structure to a computing device associated with the destination device ID before the system communicates the modified first data structure to the destination device.

6. The system of claim 5, where the processor is to identify the second virtual network ID by accessing a directory comprising device IDs associated with virtual network IDs and identifying the second virtual network ID associated with the source device ID based on the directory.

7. The system of claim 5, where:

the first virtual network ID corresponds to a first virtual network of a first computing device, the second virtual network ID corresponds to a second virtual network of a second computing device, and the processor is to authenticate the first data structure by verifying that the first virtual network ID matches the second virtual network ID.

8. The system of claim 5, where the source device ID comprises a first locally administered device ID of a hierarchal switched network, and the processor is further to:
- access a directory comprising device IDs and a plurality of locally administered device IDs, and
- replace the first locally administered device ID with a device ID associated with one of the plurality of locally administered device IDs.

9. The system of claim 5, wherein the processor is further to:
- receive a second data structure comprising a second source device ID and a second destination device ID,
- insert a virtual network ID, corresponding to the second source device ID, into the second data structure, and
- communicate the second data structure in accordance with the second destination device ID.

10. The system of claim 9, where the processor is to insert the virtual network ID by accessing a directory comprising device IDs associated with virtual network IDs, identifying a virtual network ID, associated with the source device ID, based on the directory, and inserting the identified virtual network ID into the second data structure.

11. The system of claim 9, where the processor is further to:
- access a directory comprising device IDs associated with locally administered device IDs,
- identify a locally administered device ID, associated with the source device ID, based on the directory, and
- replace the source device ID of the second data structure with the identified administered device ID.

12. The system of claim 5, where the processor is further to:
- detect a change in devices that are connected to the system,
- identify a device relocation event based on the detected change in connected devices,
- identify a previous network device corresponding to the detected change in connected devices, and
- request forwarding services, based on the detected change in connected devices, from the previous network device.

13. The system of claim 5, where the processor is further to:
- detect a change in devices that are connected to the system based on information received from a network validation server, the information corresponding to a network validation directory update, and
- update a directory which includes device IDs associated with virtual network IDs, based on the information received from the network validation server, where the information received from the network validation server relates to at least one virtual network ID of the directory.

14. A device, comprising:

a memory to store instructions; and a processor to:
receive a data structure identifying a first virtual network and a second computing device as a destination of the data structure, the data structure originating from a first computing device corresponding to the first virtual network;
determine, based on the data structure, that the second computing device is associated with the first virtual network;
communicate an identifier of the second computing device to the first computing device; and
in response to determining that the first computing device is disconnected from the first virtual network, update a directory that associates computing devices with virtual networks by removing information associating the first computing device with the first virtual network from the directory.

15. The device of claim 14, where the processor is to determine whether the second computing device is associated with the first virtual network by:
accessing the directory,
identifying a second virtual network associated with the second computing device, and
determining whether the second virtual network associated with the second computing device corresponds to the first virtual network.

16. The device of claim 14, where the processor is to determine whether the second computing device is associated with the first virtual network by:
obtaining, based on the data structure, a locally administered device identifier (ID), of a hierarchal switched network, corresponding to the second computing device,
accessing a directory that associates locally administered device IDs with virtual networks,
identifying the second virtual network associated with the locally administered ID corresponding to the second computing device, and
determining whether the second virtual network, corresponding to the second computing device, corresponds to the first virtual network.

17. The device of claim 14, where the processor is further to:
receive a second data structure, the second data structure comprising a new association between a virtual network and a computing device; and
update the directory that associates computing devices with virtual networks in accordance with the new association between the virtual network and the computing device.

18. The device of claim 17, where the processor is further to:
identify a virtual network ID corresponding to the directory update;
map the network ID to at least one locally administered device address, the at least one locally administered device address comprising a locally administered device address of a hierarchal switched network;
identify, based on the locally administered device address, at least one network device affected by the directory update; and
communicate information to the at least one network device, the information descriptive of the directory update.

19. One or more non-transitory computer-readable storage media storing one or more computer-executable instructions that, when executed by a processor, cause the processor to perform a method, the method comprising:
receiving a data structure comprising a first virtual network identifier (ID) and a protocol ID;
identifying a second virtual network ID based on the protocol ID;
authenticating the data structure based on the first virtual network ID and the second virtual network ID;
providing, to a first computing device that originates the data structure, a device ID associated with the protocol ID in response to authenticating the data structure; and
in response to determining that the first computing device is disconnected from the first virtual network, updating a directory that associates computing devices with virtual networks by removing information associated with the first computing device from the directory.

20. The media of claim 19, where:
the first virtual network ID corresponds to a first virtual network of the first computing device,
the protocol ID corresponds to a protocol ID of a second computing device,
the second virtual network ID corresponds to a second virtual network of the second computing device, and
the device ID corresponds to a device ID of the second computing device.

21. The media of claim 20, where the device ID of the second computing device comprises a locally administered device ID of a hierarchal switched network.

22. The media of claim 20, where authenticating the data structure based on the first virtual network ID and the second virtual network ID comprises:
comparing the first virtual network ID to the second virtual network ID, and
verifying that the first virtual network ID matches the second virtual network ID.

23. The media of claim 20, where identifying the second virtual network ID based on the protocol ID comprises:
obtaining a device ID corresponding to the protocol ID,
accessing the directory, the directory comprising device IDs associated with virtual network IDs, and
identifying a virtual network ID associated with the device ID using the directory.

24. The media of claim 23, where the device ID comprises an locally administered device ID of a hierarchal switched network, and
obtaining the device ID corresponding to the protocol ID comprises:
communicating the protocol ID of the data structure to a network address server, and
receiving the locally administered device ID from the network address server in response to communicating the protocol ID to the network address server.

* * * * *